United States Patent [19]

Bosshard

[11] 3,965,359

[45] June 22, 1976

[54] IRRADIATION PLANT HAVING A COMMON CLOSURE

[75] Inventor: Ernst Bosshard, Winterthur, Switzerland

[73] Assignee: Sulzer Brothers Limited, Winterthur, Switzerland

[22] Filed: Sept. 5, 1974

[21] Appl. No.: 503,336

[30] Foreign Application Priority Data

Sept. 5, 1973 Switzerland ........................ 12729/73

[52] U.S. Cl. ............................ 250/432 R; 250/435; 250/492 R; 250/507

[51] Int. Cl.[2] ........................................ G01N 23/12

[58] Field of Search ........................... 250/432–437, 250/492, 507; 21/54 R, 102 R; 210/64, 259

[56] References Cited

UNITED STATES PATENTS

| | | | |
|---|---|---|---|
| 3,229,096 | 1/1966 | Bonilla et al. | 250/507 |
| 3,865,734 | 2/1975 | Woodbridge | 250/432 |

*Primary Examiner*—Davis L. Willis
*Attorney, Agent, or Firm*—Kenyon & Kenyon Reilly Carr & Chapin

[57] ABSTRACT

The container for holding the radiation sources is provided with a circular upper end and is closed by a common closure member. This member is, in turn, clamped onto the container by a holder via a bayonet connection. A clamping tool is also provided to remove the holder and permit replacement of the radiation sources. This tool also enables the holder and closure member to be pre-stressed before removing the holder and after re-assembly of the holder.

11 Claims, 5 Drawing Figures

IRRADIATION PLANT HAVING A COMMON CLOSURE

This invention relates to an irradiation plant and particularly to a plant for treating clarified sludge.

Irradiation plants for irradiating flowable material, particularly clarified sludge, by means of radioactive radiation sources have been known for some time. In some instances, these plants have been constructed with an irradiation chamber which is intended to receive the material to be treated and which is to house a container of radiation sources for treatment purposes. The container has generally been provided with ducts adapted to be sealed in liquid-tight relationship with respect to the material for the introduction and removal of the radiation sources. A plant of this kind is disclosed in German Specification No. 2,208,160. In order to protect the radiation sources, the ducts in the container for the introduction and removal of the radiation sources are each adapted to be closed by a screw closure to prevent penetration of the material for irradiation.

However, it has been found in practice that the closure of each individual duct by its own closure is complex. Further, since the closure screws have to be screwed in and out by long manipulating tools through a thick layer of water for absorbing the radiation, there is the additional risk of the screws dropping and falling into the recycled water. In such a case, the screws may damage the closure members and recycling pump of the plant.

Accordingly, it is an object of the invention to provide an irradiation plant of the above type in which the radiation sources can be changed in much shorter time so that the plant operation is more economic.

It is another object of the invention to provide a simple means for closing the radiation charging and discharging ducts of a radiation source container within an irradiation chamber.

It is another object of the invention to provide a simple tool for use in opening and closing a radiation source container in an irradiation chamber of an irradiation plant.

Briefly, the invention provides an irradiation plant for irradiating flowable material which has an irradiation chamber, a container within the chamber for receiving a plurality of radiation sources and having a plurality of ducts for the introduction and removal of the radiation sources, a common closure member for closing the ducts in seal-tight relation and a means for clamping the closure member into contact with the container.

The use of a common closure member for all the apertures of the source container gives the additional advantage of greatly reducing the risk of one or more apertures not being completely sealed.

Advantageously, the means for clamping the closure member is in the form of a holder constructed as a ring which bears on the source container and acts via pressure screws on the closure member. To this end, the closure member is also in the shape of a ring. The holder also includes a plurality of claws which depend from the ring to engage cams on the peripheral exterior of the upper end of the container and thereby form a bayonet lock.

In addition, a clamping tool is provided which can be operatively connected to the holder by a bayonet lock to enable the holder, closure member and any sealing means provided between the source container and the closure member to be prestressed. In one embodiment, the clamping tool consists of a yoke with bayonet lock claws, a pressure plate and pressure pins which correspond to bores in the holder and which pass through the holder to abut the closure member. The tool also includes a working cylinder for moving the yoke and pressure plate relative to each other.

The source container may be suspended in the irradiation chamber from lateral bearer arms which are provided with suitable ducts for charging and discharging a protective liquid into and from the source container.

These and other objects and advantages of the invention will become more apparent from the following detailed description and appended claims taken in conjunction with the accompanying drawings in which:

Figure 1:
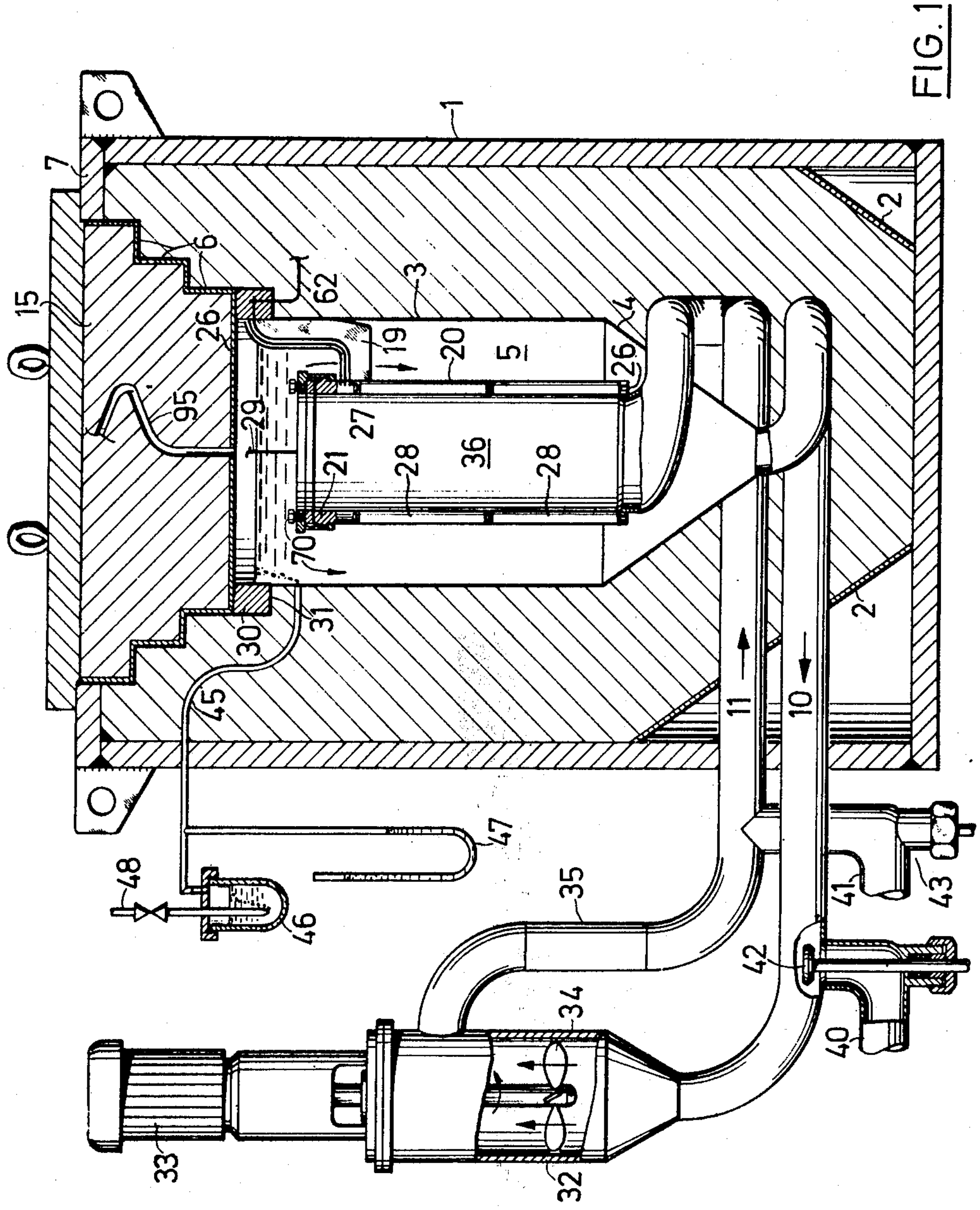
FIG. 1 illustrates a sectional view of an irradiation plant according to the invention.

Referring to FIG. 1, an irradiation plant for treating a flowable material such as clarified sludge includes a steel container or shell 1 of cylindrical shape. The container 1 houses a conical boundary wall 2 at the lower end as viewed as well as a cylindrical sheet metal wall 3 and funnel 4. As shown, the wall 3 and funnel 4 define an irradiation chamber 5 for receiving flowable material for treatment. A step-shaped member 6 which is also made from sheet metal extends upwardly from the wall 3 and at the top end is molded to a ring 7 connected to the steel container 1.

The funnel 4 is connected at the bottom to a discharge tube 10 which comprises a plurality of turns and which leads into atmosphere, while a tube 11 which also comprises a plurality of turns passes through the wall of the steel container 1, the boundary wall 2 and the funnel 4 and extends upwardly terminating in a trumpet shape. Lead is cast so as to be free of shrink holes into the space between the steel container 1, the irradiation chamber 5 and the ring 7. A shielding cover 15 which is also of stepped construction with steps that match those of the member 6 rests on the steps of the member 6 to close the chamber 5.

Figures 2, 4, 5:
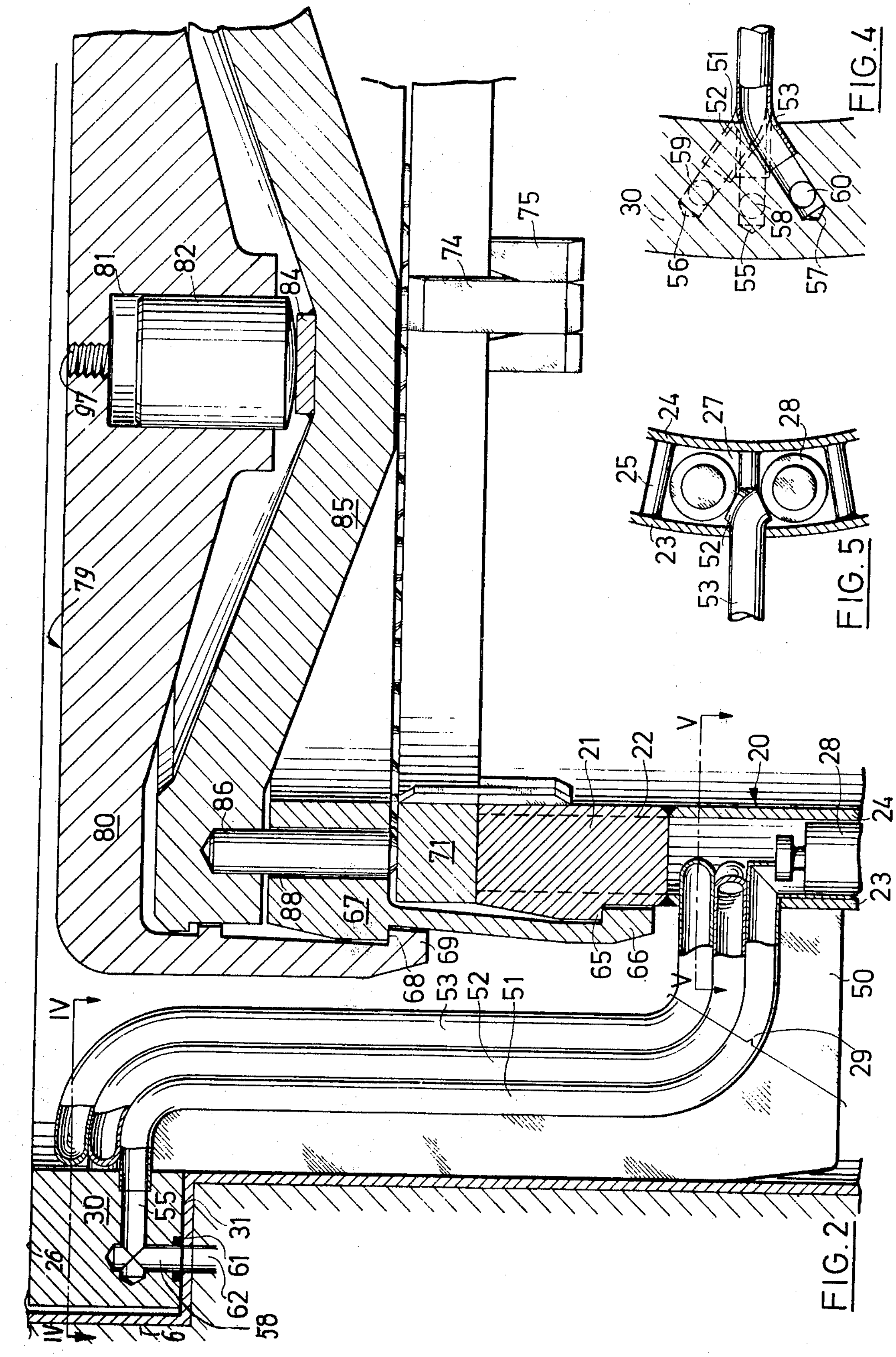
FIG. 2 illustrates a sectional view through part of the source container with the clamping tool fitted, the section being taken on the axis of symmetry between two adjacent cells of the source container.
FIG. 4 illustrates a horizontal section on line IV—IV in FIG. 1.
FIG. 5 illustrates a horizontal section on line V—V in FIG. 1.
Figure 3:
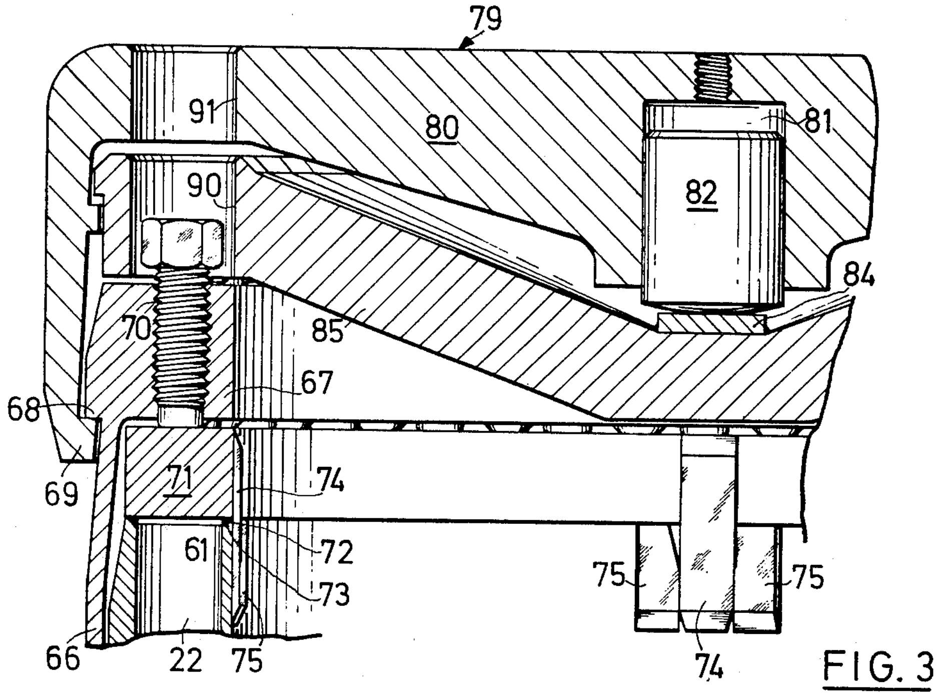
FIG. 3 illustrates a sectional view through a part of the source container, again with the clamping tool fitted, the section being taken through the axis of a cell.

The trumpet-shaped end of the tube 11 bears against an annular radiation source container 20 which comprises a top annular part 21 with a plurality of axial extending bores 22 (FIG. 3). An outer tube 23 and an inner tube 24 are welded to the bottom of the annular part 21 and are connected at their bottom end by an annular bottom plate 26. Spacer tubes 25 are welded between the two tubes 23 and 24 and their length is equal to the diameter of the bores 22. The spacer tubes 25 are so disposed along the generatrices of the source container 20 that they form cells 27 (FIG. 5) therein, which are open towards one another and in each of which, two rod-shaped radiation sources 28 are accommodated one above the other. The spacer tubes 25 form a guide for the source rods 28 and support the rods 28 laterally.

As shown in FIG. 1, the discharge tube 10 leads to a circulating device 32 which consists of a cylindrical vessel containing a four-blade propeller 34 driven by a motor 33. A connecting line 35 leads from the top end of the device 32 to the inlet tube 11. In addition, discharge and inlet lines 40, 41, respectively, branch off from the discharge tube 10 and the inlet tube 11 with shut-off valves 42, 43 provided in the branch-off points. The wall of the steel container 1 has an S-shaped tube 45 passing through the top zone, which tube 45 is connected to a liquid trap 46 and a U-tube manometer 47. The trap is fed with air via a line 48 and contains a water supply through which the introduced air is bubbled.

Referring to FIG. 1, the source container 20 is connected by four laterally spaced radial L-shaped arms 29 in suspended relation to a bearer ring 30 which rests on the bottom step 31 of the member 6. As shown, the shielding cover 15 also rests on the ring 30. As will be seen from FIG. 2, the arms 29 each consist of an L-shaped sheet metal member 50 to the top end face of which are welded three Z-shaped ducts or tubes 51, 52, 53. As will be seen in FIG. 4, the three tubes 51–53 lead at a horizontal tangent into blind holes 55, 56, 57 in the bearer ring 30 and communicate with holes 58, 59, 60 disposed on the underside of the ring 30. Sealing rings 61 are fitted in slightly conically under-cut portions at the ends of the holes 58–60 to seal against the step 31. Inlet and outlet bores 62 for a protective medium for the source container 20 are provided coaxially of the bores 58–60 in the bottom step 31 of the member 6.

The bottom ends of the tubes 51–53 are bent inside the source container 20. The end of the top tube 53 points towards the reader of the drawing, the middle tube 52 points away from the reader and the bottom tube 51 extends down towards the bottom plate 26 of the source container, to terminate as an open tube.

Referring to FIG. 2, a circular ring closure member 71 is mounted on the upper part of the source container 20, i.e. on the annular part 21. To this end, the part 21 is in the form of a circular ring so that the closure member 71 can be lowered onto the source container in any position.

In order to hold the closure member 71 in place, a means such as holder 67 is provided. This holder 67 includes a ring which bears on the closure member 71 and a plurality of depending claws 66. These claws 66 each engage under one of a plurality of cams 65 on the peripheral exterior of the annular part 21 of the source container 20. The claws 66 and cams 65 serve to form a bayonet lock. As shown in FIG. 2, each claw 66 has a depending elongated section and an enlarged foot engaging under a cam 65 of the container 20. In addition, a plurality of pressure screws 70 (FIG. 3) are threaded through the ring of the holder 67 into abutment with the closure member 71 to press the member 71 against the annular part 21. In this way, the elongated claw section of each claw 66 is placed under a tensile force to clamp the closure member 71 between the holder 67 and container 20. If the screws 70 have been screwed in sufficiently, the member 71 seals off the ducts 22 so that the ducts 22 are liquid-tight. Sealing rings 72 are additionally provided in slightly conically under-cut turned portions 73 of the ducts 22. The screw threaded holes in the holder 67 for the compression screws 70 extend coaxially of the bores 22 in the annular part 21.

The plant operates as follows:

The initially empty irradiation chamber 5 is fed with material for irradiation, for example clarified sludge, via line 41 with the motor 33 running, until the U-tube manometer 47 shows the required level. During this filling operation, air escapes from the irradiation chamber 5 via a venting line 95 provided in the cover 15. During the irradiation phase which now starts, the clarified sludge is circulated by the circulating device 32 via the connecting line 35, feed line 11, interior 36 of source container 20, the annular space between the source container 20 and the wall 3, and through the outlet of discharge line 10. The multiple curvature of the inlet and outlet lines 11 and 10 not only prevents radioactive rays from escaping from the irradiation chamber 5, but also ensures that the clarified sludge is intimately mixed so that after repeated circulation there is a very high probability that every particle has received practically the same radiation dose.

A protective medium, for example water to which a corrosion inhibitor has been added, is fed to the source container 20 via each tube 51 of the four arms 29. The water is distributed at the base of the source container 20 on both sides of the mouth of the tube 51 in the circumferential direction of the container 20, and then rises up along the source rods 28 and cools the rod 28. The protective medium is then collected by the four tubes 52, 53 in each arm 29 and discharged on the way via lines 62.

When the clarified sludge has absorbed the required radiation dose, the sludge is pumped away via the outlet line 40, whereupon new clarified sludge is introduced via the line 41 and the cycle starts afresh.

If the radioactive sources in the source container 20 are to be changed, whether to make up for burning or to change the intensity of the sources, the system is flushed repeatedly after the clarified sludge has been pumped away. A tube (not shown) of a length of several meters and of approximately the same outside diameter as the container 1, is fitted vertically on the ring 7 of the container 1 during the actual flushing operation. The irradiation chamber 5 is then flooded with clean water, the venting line 95 allowing the water to rise in the fitted tube as well. When there is a sufficiently high water level produced, the cover 15 is separated from the container 1 and removed. Source magazines are then lowered into the four sectors between the four arms 29, where they are suspended from suspension eyes (not shown) on the wall 3.

A clamping tool 79 (FIGS. 2 and 3) is then lowered into the irradiation chamber 5 to release the closure member 71 from the container 20. The tool 79 consists of a yoke 80 with a pressure plate 85. The yoke 80 contains a working cylinder 81 with a piston 82 acting on an anvil 84 of the pressure plate 85 in order to move the yoke 80 and pressure plate 85 relative to each other. The pressure plate 85 carries a plurality of pressure pins 86, the axes of which extend in parallel relationship to the axis of the source container 20 and which, by passing through bores 88 in the holder 67, can abut and act on the closing ring 71. The bores 88 each extend between two adjacent bores 22 in the source container 20. The pressure plate 85 and the yoke 80 are provided with passage holes 90, 81 respectively coaxially of the bores 22 and the pressure screws 70, for the passage of a key or spanner for turning the screws 70.

A bayonnet lock for connecting the tool 79 to the holder 67 is also provided. This lock includes cams 68 on the exterior periphery of the holder 67 and depending claws 69 on the yoke 80 for engaging with the cams 68.

When the clamping tool 79 is lowered into the irradiation chamber 5, the pressure pins 86 pass through the bores 88 in the holder 67 until they abut the closure member 71. The yoke 80 is then turned so that the claws 69 come beneath the corresponding cams 68 of the holder 67. The piston 82 is then pressurized via a hose (not shown) connected to a screwthread 97, so that the pins 86 bear with considerable force on the closure ring 71 and at the same time the holder 67 is pulled upwardly by the yoke 80 with the claws 69. During this operation, the screws 70 are relieved of the load of the closure member 71 so that they can be released very easily, by means of a key or spanner passing through the passage holes 91 and 90. The application of pressure to the piston 82 is then stopped, whereupon the yoke 80 and holder 67 can be rotated together so that the claws 66 of the holder 67 come to lie next to the cams 65 on the annular container part 21. From this position, the clamping tool 79 is lifted upwards together with the holder 67 and the closure member 71 and removed from the container 1. The individual cells of the source container 20 are now accessible by gripper tools via the bores 22. The source rods are removed from the source container 20 and fitted into source magazines. After being emptied, the source container can be lifted out of the irradiation chamber 5 together with the bearer ring 30 and arms 29 thoroughly inspected. A source transport container is then lowered into the irradiation chamber 5 and the exchange of the sources in the source magazines and in the source transport container is then carried out in known manner.

After removal of the source transport container, the source container 20 is again lowered into the irradiation chamber 5 until the bearer ring 30 bears on the step 31 and the trumpet-shaped end of the feed tube 11 engages in the source container 20 at the bottom end. The source rods are then transported out of the source magazines into the source container cells. When the source container is full, the tool 79 with the holder 67 and closure member 71 is lowered into the irradiation chamber 5. In order to guide the closure member 71 into place, the centering strips 74 are provided on the member 71 to be guided between pairs of guide strips 75 on the container part 21. The closure member 71 now rests on the annular part 21 of the source container 20 and covers the ducts 22 therein.

In order to lock the closure member 71 to be liquid-tight, the yoke 80 is rotated until the claws 66 of the holder 67 are situated beneath the cams 65 of the annular part 21. The pressure screws 70 are then coaxial of the bores 22 in the annular part 21. Pressure is then applied to the working cylinder 81 so that the pressure plate 85 presses the closure member 71 on to the seals 72 in the annular part 21 (FIG. 3) by means of the pins 86. The pressure screws 70 are then screwed down in the holder 67 until they rest lightly on the closure member 71. Pressure is then removed from the working cylinder 81 so that the pressure screws 70 now hold the closure member 71 pressed on the source container 20. The container 20 is thus again sealed so as to be liquid-tight. The yoke 80 is then rotated until the bayonnet claws 69 come between the cams 68 of the holder 67, whereupon the clamping tool 79 is lifted and removed from the irradiation chamber 5. The shielding cover 15 is lowered into the container 1 and the water is discharged from the plant via the lines 40 and 41. The fitted tube can now be removed. Since the shielding cover 15 rests on the bearer ring 30, the cover 15 contributes to sealing of the irradiation chamber 5.

In the case of fixed plants, the irradiation chamber is preferably shielded to the exterior by concrete instead of lead. In that case, it would generally be more advantageous to dispose the chamber in a shaft which at the same time acts in the same way as the fitted tube for flooding the plant.

In the case of mobile plants, of course, there is no need to fit a fitted tube during the source change if a pool is available into which the complete apparatus can be immersed. For such cases, the lines 10, 11 and 45 may be provided with flanges so that the circulating device 32 and the measuring device 46 and 47 can be separated from the irradiation chamber 1.

What is claimed is:

1. A plant for irradiating flowable material comprising an irradiation chamber for receiving the flowable material;

a container within said chamber for receiving a plurality of radiation sources, said container having a plurality of ducts for the introduction and removal of the radiation sources;

a common closure member mounted on said container for closing said ducts in seal-tight relation relative to said chamber; and a holder clamping said closure member into contact with said container.

2. A plant as set forth in claim 1 which further comprises a plurality of laterally disposed bearer arms mounting said container in suspended relation within said chamber.

3. A plant as set forth in claim 2 wherein each said arm includes a plurality of ducts for charging and discharging a protective liquid into and from said container.

4. A plant as set forth in claim 3 which further comprises a step-shaped member about an upper end of said chamber, a ring mounted on said member, and a plurality of ducts under said ring leading to the exterior of said chamber and wherein each said bearer arm extends to and terminates at one end in said ring and said ducts of each said arm communicates with a respective duct under said ring.

5. A plant as set forth in claim 4 further comprising a shielding cover mounted on said ring to close said irradiation chamber.

6. A plant as set forth in claim 1 wherein said container has a circular upper end having cams on the peripheral exterior and said holder includes a ring bearing on said closure member, a plurality of claws engaging said cams to form a bayonet lock and a plurality of pressure screws threaded through said ring of said holder into abutment with said closure member to press said closure member against said upper end of said container.

7. A plant as set forth in claim 6 wherein each said claw has an elongated section and an enlarged foot engaging a respective one of said cams.

8. In combination a plant for irradiating flowable material comprising an irradiation chamber for receiving the flowable material;

a container within said chamber for receiving a plurality of radiation sources, said container having a plurality of ducts for the introduction and removal of the radiation sources;

a common closure member mounted on said container for closing said ducts in seal-tight relation relative to said chamber;

a holder clamping said closure member into contact with said container;

a clamping tool for connecting with said holder to pre-stress said holder and closure member into spaced apart relation, and a bayonet lock connecting said tool to said holder.

9. The combination as set forth in claim 8 wherein said tool includes a yoke, a pressure plate, a plurality of pressure pins within said pressure plate and passing through said holder to abut said closure member and a working cylinder for moving said yoke and pressure plate relative to each other.

10. The combination as set forth in claim 9 wherein said bayonet lock includes cams on the exterior periphery of said holder and depending claws on said yoke for engaging with said cams.

11. A plant for irradiating flowable material comprising an irradiation chamber for receiving the flowable material;

a container within said chamber for receiving a plurality of radiation sources, said container having a plurality of ducts for the introduction and removal of the radiation sources;

a common closure member mounted on said container for closing said ducts in seal-tight relation relative to said chamber; and means for clamping said closure member into contact with said container under a tensile force.

* * * * *